United States Patent [19]

Kuri

[11] Patent Number: 5,160,428
[45] Date of Patent: Nov. 3, 1992

[54] CONTINUOUS FILTER PRESS

[75] Inventor: Setsuya Kuri, Kamakura, Japan

[73] Assignee: Kuri Chemical Engineers, Inc., Tokyo, Japan

[21] Appl. No.: 555,619

[22] Filed: Jul. 23, 1990

[30] Foreign Application Priority Data

Jul. 24, 1989 [JP] Japan .................. 1-188927

[51] Int. Cl.$^5$ ............................ B01D 29/66
[52] U.S. Cl. .................. 210/107; 210/108; 210/111; 210/112; 210/143; 210/323.2; 210/329; 210/333.01; 210/334; 210/342; 210/346; 210/393; 210/408; 210/412; 210/414; 210/415
[58] Field of Search .............. 210/107, 108, 111, 143, 210/329, 332, 333.01, 334, 342, 393, 408, 411, 412, 415, 323.1, 323.2, 433.1, 414, 112, 770, 298, 410, 346

[56] References Cited

U.S. PATENT DOCUMENTS

| | | | |
|---|---|---|---|
| 1,381,944 | 6/1921 | Sweetland | 210/333.01 |
| 2,862,622 | 12/1958 | Kircher, Jr. et al. | 210/333.01 |
| 2,946,444 | 7/1960 | Zievers et al. | 210/408 |
| 3,659,718 | 5/1972 | Brociner et al. | 210/333.01 |
| 4,165,283 | 8/1979 | Weber et al. | 210/298 |
| 4,464,253 | 8/1984 | Kuri | 210/414 |
| 4,482,461 | 11/1984 | Hindman et al. | 210/143 |
| 4,552,669 | 11/1985 | Sekellick | 210/333.01 |
| 4,786,408 | 11/1988 | Sahara et al. | 210/323.2 |

FOREIGN PATENT DOCUMENTS

| | | | |
|---|---|---|---|
| 13007 | 1/1911 | France | 210/415 |
| 744372 | 2/1956 | United Kingdom | 210/111 |

Primary Examiner—Robert A. Dawson
Assistant Examiner—Matthew O. Savage
Attorney, Agent, or Firm—Sherman & Shalloway

[57] ABSTRACT

The device is the dual functional filter of the slurry, scraping of the filtered cake, compression the scraped cake and discharging the compressed cake, continuously. The device is composed of both the filter part and the cake compression part. While the filter part is positioned upward holding the filtrate room, the slurry chamber and the filter medium in between, the lower cake compression part contains the screw blade attached to the shaft stationed from the top of the filter part to the end of the cake compression part. The filter cake piled on the filter medium during the filtration of the slurry fed under pressure, is scraped by the scraping blades attached to the shaft or, if necessary, peeled off by the pressure flashings of the back wash liquid through the cake on the filter medium. Precipitated cakes from the above is compressed in the compression part by the screw. The torc controller of the shaft motor and/or other appropriate instruments controls the extent of compression of the cake, by regulating the control valve at the end of the compression part, enabling at the same time to discharge the compressed cake. As the time consumed for even peeling off the heel cake is very small, the filtration can be done in enclosure, automatically and substantially in continuity.

9 Claims, 10 Drawing Sheets

FIG. 4

FIG. 6-A
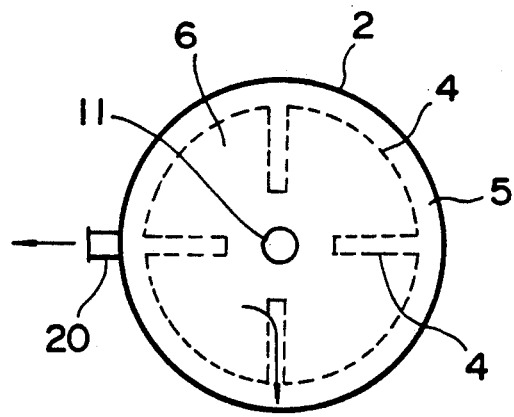
FIG. 6-B
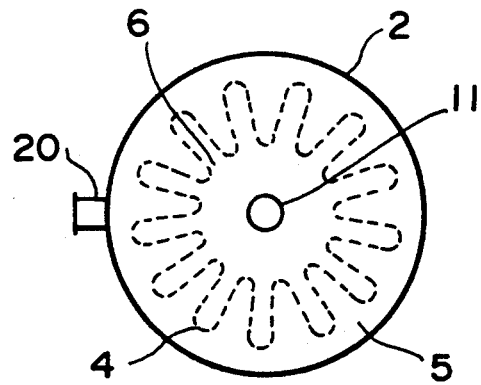

CONTINUOUS FILTER PRESS

BACKGROUND OF THE INVENTION

1. Field of the Invention

This invention relates to a continuous filter press, and more specifically, to a continuous dual functional filter for the slurry fed under pressure which also scrapes the cake piled on the filter medium, compresses and discharges the precipitated cakes continuously.

2. Description of the Prior Art

Prior arts of the pressure filters are all not continuous but batch types, such as the conventional filter press, leaf filter, tubular filter and etc. Inevitable defects they have;

(a) To take filtered cakes out of filter, the filter has to be opened up, causing to emit the solvent vapor or the order in the open.

(b) The drawn out cakes, mostly mixed with the remaining slurry, have to be removed by hands or transferred often in the open by the conveyer.

(c) At least a worker is needed for its operation, even of the complete automatic type.

(d) Skillful alignment of the filter medium to the frame, is necessary to prevent the slurry leak.

A screw press is exceptionally continuous, however it has a fundamental defect that is originated in its performance to filter the slurry as well to compress its cake with all mechanical force by pushing them against the perforated metallic cylinder with large diameter holes such as one to several milimeter.

Inevitably the filtrate through the perforated cylindrical drum, carries along considerable amount of constituent solid particles.

Moreover, the discharge of the compressed cake is done through the blocking plate, which accompanied various inconveniences in operation and gives unfavorable effect to the extent of the cake compression.

In order to improve the above shortcomings, U.S. Pat. No. 4,464,253, GB Patent No. 2119670 and Japanese Patent Publication No. 4324/90 were applied. Applying the above patent for the filtration of slurries having coarse, as much as say 30$\mu$ or like and hard particles, for example a slurry having active carbon particles, has been successful in continuous operation for long time, say successive 7 days or more, with keeping a constant cake thickness and holding a constant filtration rate by scraping the cake.

However, the viscous slurries having fine as small as, say a few microns or like and soft particles, for example Al(OH)$_3$ and etc., are likely to plug up the heel cake far sooner than the former slurry, which necessitates to peel the heel cake off and to clean the filter medium prior to complete plug up.

The invention is an enclosed continuous filter press, accompanying automatic back washing devices to peel off the heel cake, to clean the filter medium and at the same time recover cakes in a compressed state, all in enclosure and in a very short time, to function as an almost continuous filter press in enclosure, which reducing the loss time as much as possible.

SUMMARY OF THE INVENTION

It is therefore a primary object of the present invention to provide a continuous filter press of the closed system, in which a series of filter cake-discharging and filter medium-washing operations can be automatically performed at a high efficiency with a much reduced loss time.

More specifically, in accordance with the present invention, there is provided an enclosed and continuous filter press comprising:

a filtering zone comprising a filter medium, and a filtrate-collecting chamber and a chamber for containing a slurry and a filtered cake;

a cake-compressing conical zone connected at one end of the filter chamber, where a rotating screw squeezes and moves downward falling cakes scraped end puled off from the filter zone;

a cake-discharging zone connected to the other end of the cake-compressing zone for discharging a compressed cake formed in the cake-compressing zone;

a slurry feed opening and closing valve arranged on the slurry feed mechanism;

a cake discharge control mechanism for detecting the cake-compressing degree in the cake-compressing zone and opening or closing the cake-discharging zone to control the discharge of the compressed cake;

a backwashing mechanism for peeling off the heel cake and washing the filter medium;

a slurry relief conduit and valve, for decreasing immediately the pressure in the filter chamber;

a detecting mechanism of clogging up of the filter medium, such as checking the flow rate of the filtrate and measuring the pressure difference between the filter zone and the filtrate collecting chamber;

a control mechanism with an aid of the above detecting mechanism, of shutting the slurry feed, introducing the backwashing fluid to the filtrate collecting chamber and opening the relief valve to lessen the pressure in the filter chamber at least once during the backwashing period, thus enabling to clean the filter medium in a very short time and at the same time collecting the peeled off cakes in the compression zone.

BRIEF DESCRIPTION OF THE DRAWINGS

FIG. 4 is a time chart illustrating operations of respective members in the apparatus of the present invention.

FIGS. 6-A and 6-B are sectional plane views showing the filtering zone of the apparatus shown in FIG. 5.

DETAILED DESCRIPTION OF THE PREFERRED EMBODIMENTS

Figure 1:
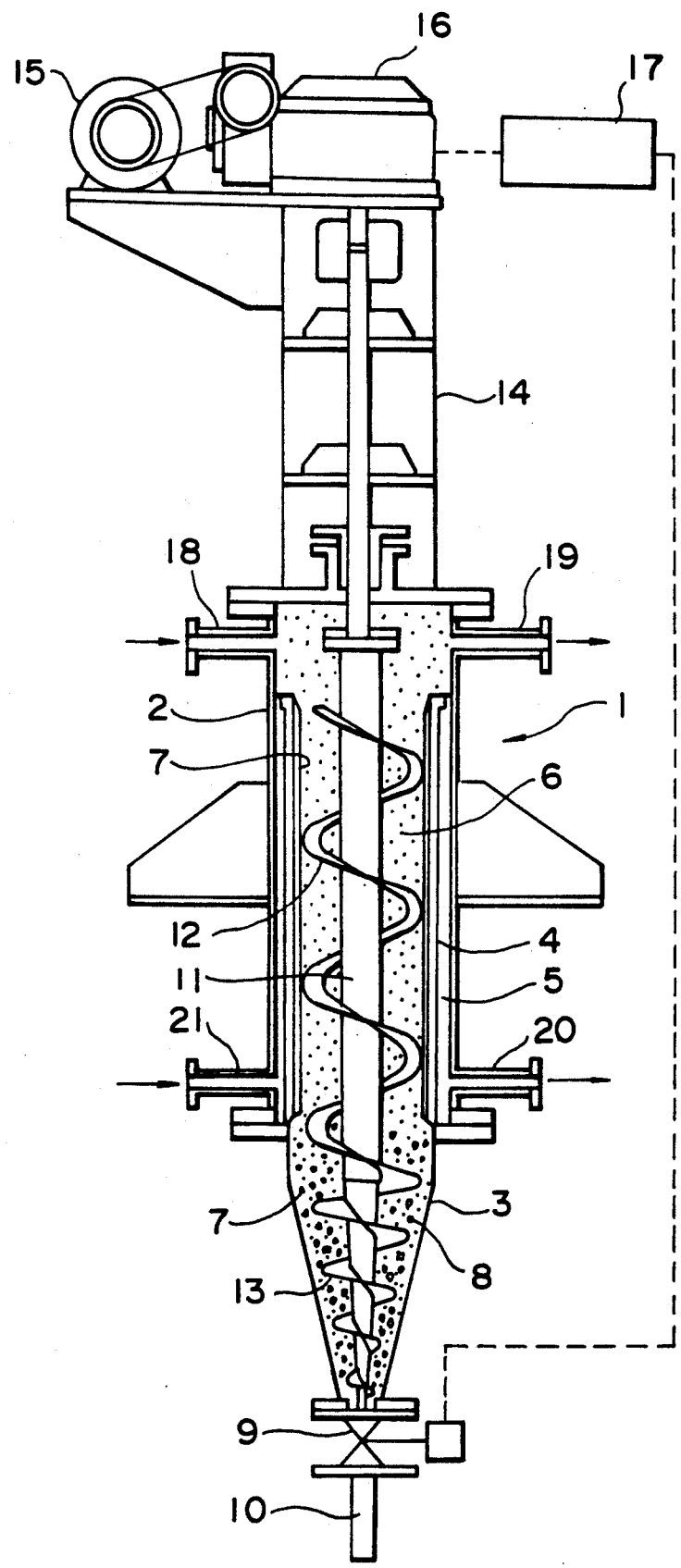
FIG. 1 is a sectional side view showing the main portion of one embodiment of the apparatus of the present invention.

The continuous filter press of the present invention comprises, in principle, a filtering zone and a cake-compressing zone, and in the filtering zone, filtration of a slurry is exclusively carried out and in the cake-compressing zone, compression of a peeled cake formed in the filtering zone is exclusively performed.

The slurry to be filtered is supplied under pressure into a filter chamber. The filtrate flows passes through a cake layer and a filter medium into a filtrate-collecting chamber, while the solid component is caught on the cake layer and accumulated thereon to gradually increase the thickness of the cake layer.

The thickness of the cake is held constant by scraping increased cake during the filtration with rotating blades or the like, enabling to avoid the filtration velocity to fall down, while scraped cakes are collected in the cake-compressing zone.

The cake-compressing zone comprises a known compressing mechanism such as a screw and has a tapered structure. In this cake-compressing zone, filtration is not carried out, but only the operation of compressing the cake toward the cake-discharging valve and the return of the squeezed liquid to the filter chamber.

The cake compression extent (the solid content of the cake) can be measured, for example, by detecting the torque or pressure imposed on the compressing screw. In the case where the torque value exceeds a certain expected value, the cake-discharging zone (valve) is opened, and in the case where the torque value becomes smaller than a certain standard value, the cake-discharging zone (valve) is closed.

Even in the filtration apparatus of the above-mentioned type, while the operation is continued for a long time, fine particles of the solid component penetrate in the cake or filter medium and the filtration speed is gradually decreased. In the present invention, peeling of the cake and washing of the filter medium are performed by using mechanisms according to the following procedures.

First of all, the slurry feed is stopped and backwashing liquid or fluid is charged under pressure, say $1 \sim 3$ Kg/cm$^2$, into the filtrate chamber, making the pressure all in the filter zone to $1 \sim 3$ Kg/cm$^2$.

By using such as a sequence controller, a very small relief valve on the top of the filter zone is opened for a short time, say 1 second, to escape a very small amount of the slurry in the filter zone to make go down the pressure in it to zero.

The above backwashing procedure is performed at least once, usually $5 \sim 10$ times, in a period of a few minutes, which peels off the heel cake and cleans the filter medium by taking place of pressure flushing across the filter medium.

The plug up of the cake or filter medium is detected as (i) the elapse of filtering time, (ii) the decrease of the flow rate of the filtrate per unit time or (iii) the pressure difference between the filter zone and the filtrate-collecting chamber.

When plug up is detected by any mechanism the filtering operation is changed over to the backwashing operation.

In the present invention, by catching a plug up signal from the detecting mechanism, the above backwashing procedure is started.

While the cake layer formed on the filter medium is peeled off the surface of the filter medium at the time of flushing, the peeled cake is fed (dropped) into the cake-compressing zone and is subject to the production of a compressed cake. Furthermore, the slurry discharged to the outside at the time of washing is recycled to the slurry pressure feed supply mechanism or the starting slurry tank, whereby the continuous filtering operation can be performed in the closed circuit effectively.

After the filter medium-washing operation is completed, the slurry discharge relief valve is closed, and the filtrate-collecting chamber is connected to the filtrate recovery tank. Then, the slurry feed opening and closing valve is opened, and the pressure filtration and the compression of the cake are started again.

The respective operating conditions will now be described in detail.

Referring to FIG. 1 illustrating the main portion of one embodiment of the continuous filter press of the present invention, the apparatus proper 1 comprises a pressure vessel 1 having a filtering zone 2 and a cake-compressing zone 3. In the embodiment illustrated in FIG. 1, the filtering zone 2 has a column shape and the cake-compressing zone 3 has a frustoconical shape. The filtering zone 2 comprises a filter medium 4, a filtrate-collecting chamber 5 arranged on one side of the filter medium 4, and a slurry- and cake-containing chamber 6 arranged on the other side of the filter medium 4. As shown in FIG. 1, a cake layer 7 is formed on the surface of the filter medium 4. In this embodiment, the filter medium is arranged in one layer in the cylindrical form, and the slurry- and cake-containing chamber 6 is arranged in the inner side of this filter medium 4 and the filtrate-collecting chamber 5 is arranged in the outer side of the filter medium 4. The arrangement of the filter medium 4, the slurry-containing chamber 6 and the filtrate-collecting chamber 5 is not limited to that shown in FIG. 1 but the filter medium 4 can be arranged in two or three layers or more to increase the filtration area. Of course, naturally the filtration can be effected from the outer side of the filter medium as well.

The cake-compressing zone 3 is located below the filtering zone 2, and the interior space 8 of the cake-compressing zone 3 communicates with the slurry -and cake-containing chamber 6. The lower end of the cake-compressing zone 3 is connected to a compressed cake discharge zone 10 through a cake discharge valve 9.

A driving shaft 11 is arranged through the centers of the filtering zone 2 and the cake-compressing zone 3, and a scraping blade 12 for scraping the cake is attached to the driving shaft 11 in the portion corresponding to the filtering zone 2 and a screw 13 for compressing the cake is arranged on the driving shaft 11 in the portion corresponding to the cake-compressing zone 3.

An extension 14 is formed above the pressure vessel 1 which comprises, for example, a motor 15 and a reduction gear 16, is arranged in the extension 14.

In the present embodiment, since the compression degree of the compressed cake formed in the cake-compressing zone 3, that is, the solid content in the cake, is almost parallel relation to the torque imposed on the driving shaft 11, a control mechanism 17, that is, a torque controller 17, is arranged to regulate the cake discharge valve 9 to automatically control the discharge of the compressed cake.

In the slurry- and cake-containing chamber 6 of this continuous filter press, a slurry supply pipe 18 for feeding slurry and a slurry relief pipe 19 for relieving the slurry during the backwashing operation are provided, and in the filtrate-collecting chamber 5, a filtrate withdrawal pipe 20 for withdrawing a filtrate during the filtering operation and a back-washing liquid supply pipe 21 for feeding a back-washing liquid during the back-washing operation are provided.

Figure 2:
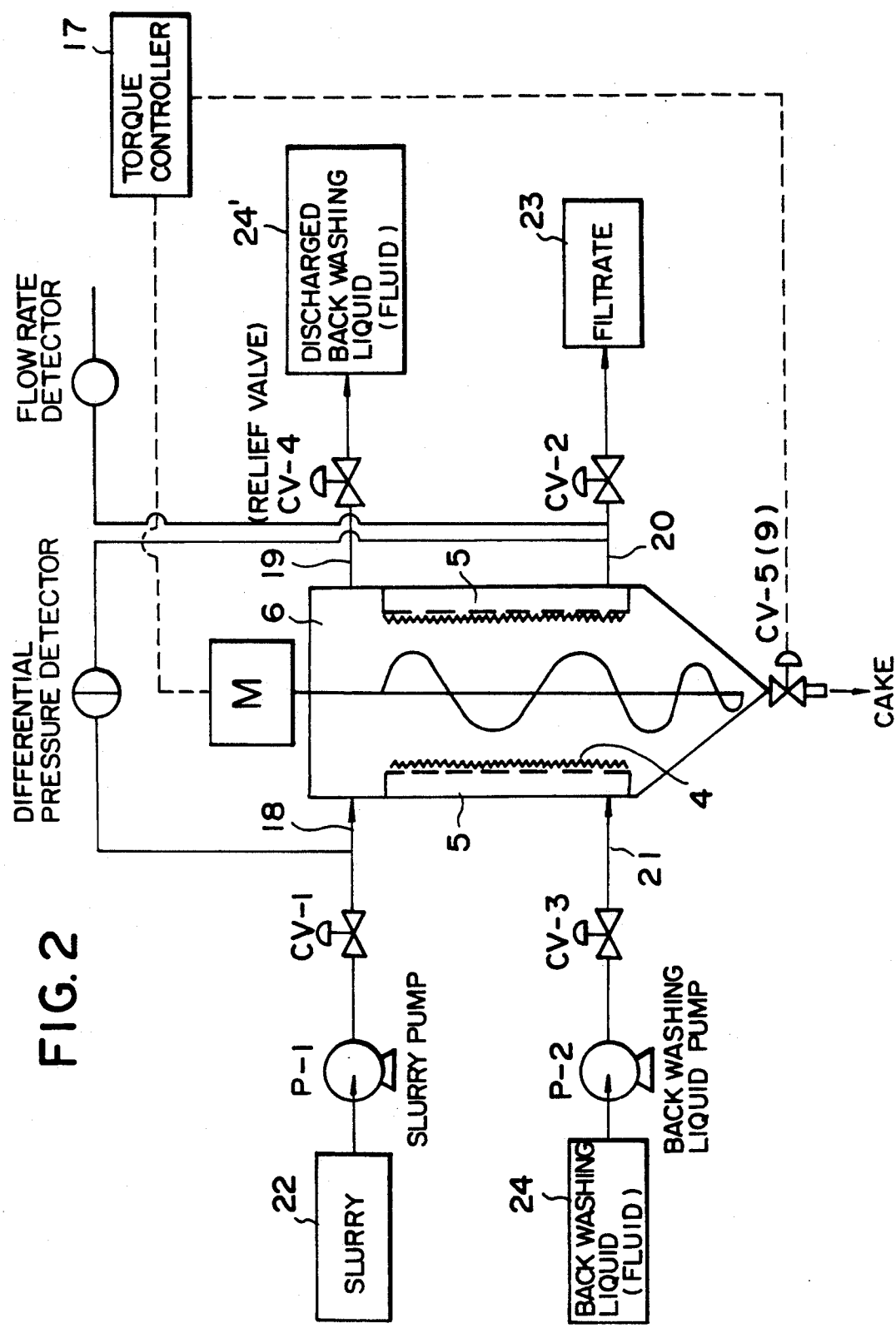
FIG. 2 is a view showing the systematic arrangement of one embodiment of the apparatus of the present invention.

Referring to FIG. 2 illustrating the process diagram of the continuous filter press of the present invention, the slurry supply pipe 18 is connected to a slurry store tank 22 through valve CV-1 and a slurry pump P-1 for feeding the slurry under pressure. The filtrate withdrawal pipe 20 is connected to a filtrate recovery tank 23 through valve CV-2. The back-washing liquid supply pipe 21 attached to the filtrate-connecting chamber 5 is connected to a back-washing liquid store tank 24 through valve CV-3 and a washing liquid pump P-2 for feeding the washing liquid under pressure. The slurry relief pipe 19 attached to the slurry- and cake-containing chamber 6 is connected to the slurry store tank 24' through valve CV-4. The cake discharge valve CV-5 in FIG. 2 is the same as the valve 9 in FIG. 1. In the embodiment shown in FIG. 2, the plug up of the filter medium 4 is detected by measuring the pressure difference between the slurry- and cake-containing chamber 6 and the filtrate-collecting chamber 5, with such as a pressure difference-detecting element DPS. Alternately, a flow rate detector may be employed to detect the plug-up of the filter as shown in FIG. 2.

Figure 3:
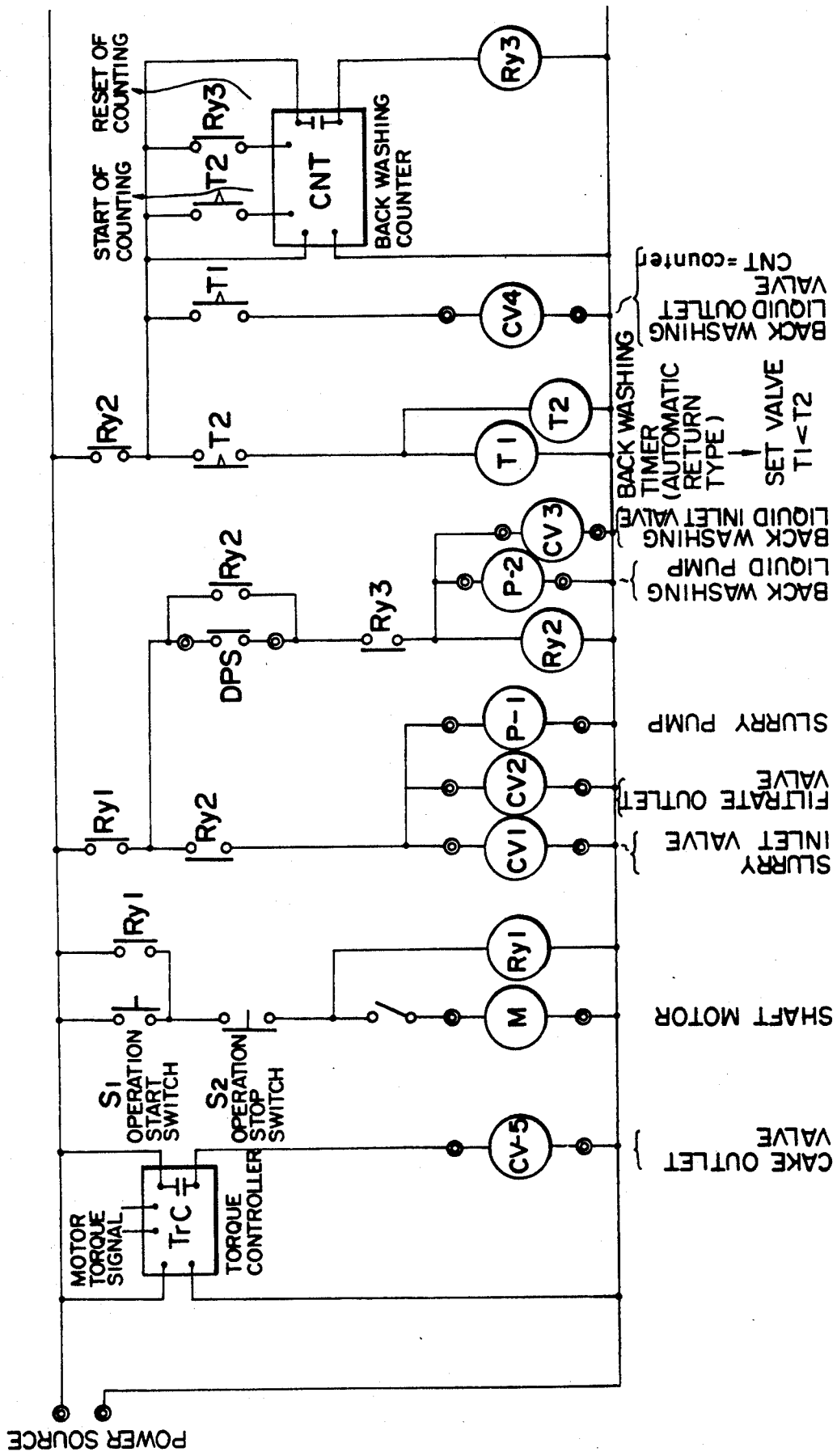
FIG. 3 is a wiring diagram of control mechanisms in the apparatus of the present invention.
Figure 4:
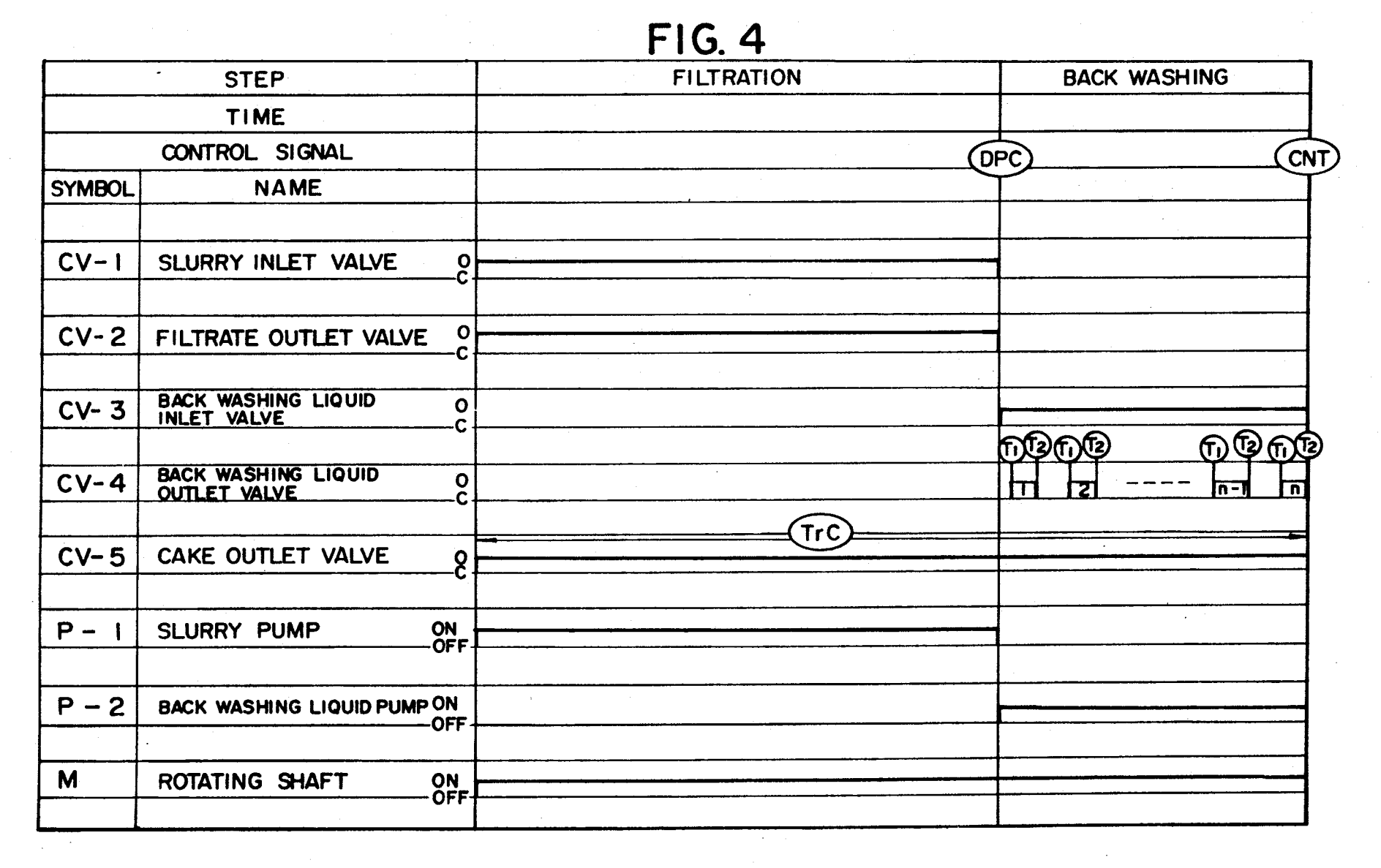

An example of sequence control of the respective elements shown in FIG. 2 is shown in an electric circuit of FIG. 3, based on a time chart shown in FIG. 4. In FIG. 3, S1 represents an operation start switch and S2 represents an operation stop switch, and TrC represents the torque controller 17 in FIG. 1. Furthermore, CNT (counter) regulates number of times of the flush back-washing of the filter medium. With respect to control signals shown in FIG. 4, each of symbols "0" given to CV-1 through CV-5 means "open", and each of symbols "C" means "closed".

The respective operations will now be described with reference to FIGS. 2 through 4.

1. Filtering Operation

When the operation start switch S1 is turned on, a motor M (15) is actuated to drive and rotate the driving shaft 11. A relay Ry1 is energized to open the slurry supply valve CV-1 and open the filtrate withdrawal valve CV-2, and the slurry pump P-1 is driven. Referring to FIG. 1, the slurry to be filtered is supplied under pressure into the slurry- and cake-containing chamber 6, and the solid in the slurry is separated as a cake layer on the filter medium 4, while the liquid in the slurry is passed through the filter medium 4 and introduced into the filtrate-collecting chamber 5 and discharged into the filtrate store tank 23 through valve CV-2.

When the thickness of the cake layer 7 on the filter medium 4 is increased beyond a predetermined value, the cake layer 7 is scraped by the scraping vane 12, dropped in the cake-compressing zone 3 and compressed by the screw 13. When the compression extent (solid concentration) of the compressed cake is over a predetermined level, the torque controller TrC is actuated by the increase of the torque of the driving shaft 11 to open the cake discharge valve CV-5, whereby the cake having the predetermined compression extent is discharged through the cake discharge zone 10. Thus, this operation is conducted continuously.

2. Back-Washing Operation

When the plug up of the filter medium 4 reaches to a certain level, the pressure difference detecting element DPS is actuated and a relay Ry2 is energized to close the slurry supply valve CV-1 and close the filtrate withdrawal valve CV-2, whereby the driving of the slurry pump P-1 is stopped. Accordingly, the pressure in the slurry- and cake-containing chamber 6 is reduced to atmospheric pressure. Simultaneously, the washing liquid supply valve CV-3 is opened and the washing liquid pump P-2 is driven, whereby the back-washing liquid is supplied under pressure to the filtrate-collecting chamber 5 and the filter medium 4. Furthermore, when the relay Ry2 is on, time reading is started in timers T1 and T2 and counting is started in counter CNT as well. In this case, the set value of the timer T2 is made larger than that of the timer T1.

After the lapse of a certain short time, the timer switch T1 is closed to open the slurry discharge small relief valve CV-4, whereby the slurry is discharged through valve CV-4 into the slurry store tank 24'. Simultaneously, the washing liquid is flushed through the filter medium 4 to back wash the filter medium 4. After another lapse of a short time, the timer switch T2 is energized to close the slurry relief valve CV-4. Simultaneously, time reading of the timers T1 and T2 is started in the same manner as described above, whereby the operation of flushing the washing liquid is carried out. This flushing operation is repeated a predetermined number (n) of times.

When the flushing operation is repeated the predetermined number of times, the counter CNT is actuated and a relay Ry3 is energized, whereby the relay Ry2 is de-energized, the slurry discharge valve CV-4 is closed and the washing liquid pump P-2 is stopped, while the slurry supply valve CV-1 is opened, the filtrate withdrawal valve CV-2 is opened and the slurry pump P-1 is driven to perform the above-mentioned filtering operation 1 again.

By the flushing of the washing liquid, the cake 7 on the filter medium 4 is peeled off, while the rotation of the driving shaft 11 is continued, enabling supply of the cake to the cake-compressing zone 3 and compression of the cake even during the washing operation. This is one of prominent advantages of the present invention.

The slurry to be filtered in the present invention includes various aqueous or organic solvent slurries containing particles of various inorganic and organic compounds. The particle size of solid component particles in the slurry is not particularly limited, and in general, slurries containing particles having even small particle size of 1 or 5 $\mu m$ to several hundred $\mu m$ can be treated according to the present invention. The solid component concentration of the slurry is not particularly limited, but in general, slurries having even wide ranges of solid component concentration of 0.1 to 50% by weight can be treated. In the present invention, in the case where filtration of fine particles, which are generally difficult to remove by filtration, a filtering aid such as diatomaceous earth can be accomodated. One prominent advantage of the present invention is that in the continuous filter press of the present invention, the operation can be carried out in the closed system. Therefore, the continuous filter press of the present invention can be advantageously applied to the filtration of a slurry containing a volatile component or a poisonous component.

As for the filter medium, there can be used knitted and unwoven fabrics of natural fibers, organic synthetic fibers, inorganic fibers such as carbon fibers and ceramic fibers, and metallic fibers, and porous sintered bodies of synthetic plastic particles and metallic particles. These media can be used in the form of a single layer or a multi-layer laminate.

The pressure applied to the slurry to be filtered depends on the kind of the slurry or filter medium, but it is preferred that the applied pressure be 1 to 5 $kg/cm^2$ (gauge), especially 2 to 4 $kg/cm^2$ (gauge).

The same liquid as in the slurry, or a liquid different from the filtrate, or a part of the filtrate can be used as the back-washing liquid for the back washing procedure. Steam or a gas can be used for the back washing in some cases.

Generally, it is preferred that the pressure applied to the washing liquid be 1 to 2 $kg/cm^2$ (gauge). It also is preferred that the time (t1) during which the slurry relief is stopped be 1 to 30 seconds, while the time (t2−t1) during which the flushing of the washing liquid is conducted be 1 to 10 seconds. The frequency (n) of the flushing of the washing liquid depends on the stickiness of the cake, but the frequency (n) is preferably 1 to 30.

According to the present invention, a very high compression can be achieved to get a compressed cake having a higher solid concentration than by the conventional filter press. This compressed cake is discharged in the form of a string or rod. As pointed out hereinbefore, withdrawal of the compressed cake is carried out substantially continuously during the operation.

The continuous filter press of the present invention comprising the filtering zone and the cake-compressing zone is not limited to the above-mentioned embodiment, but various modifications can be made. Several other embodiments of the present invention will now be described, though the present invention is by no means limited by these embodiments.

Figure 5:
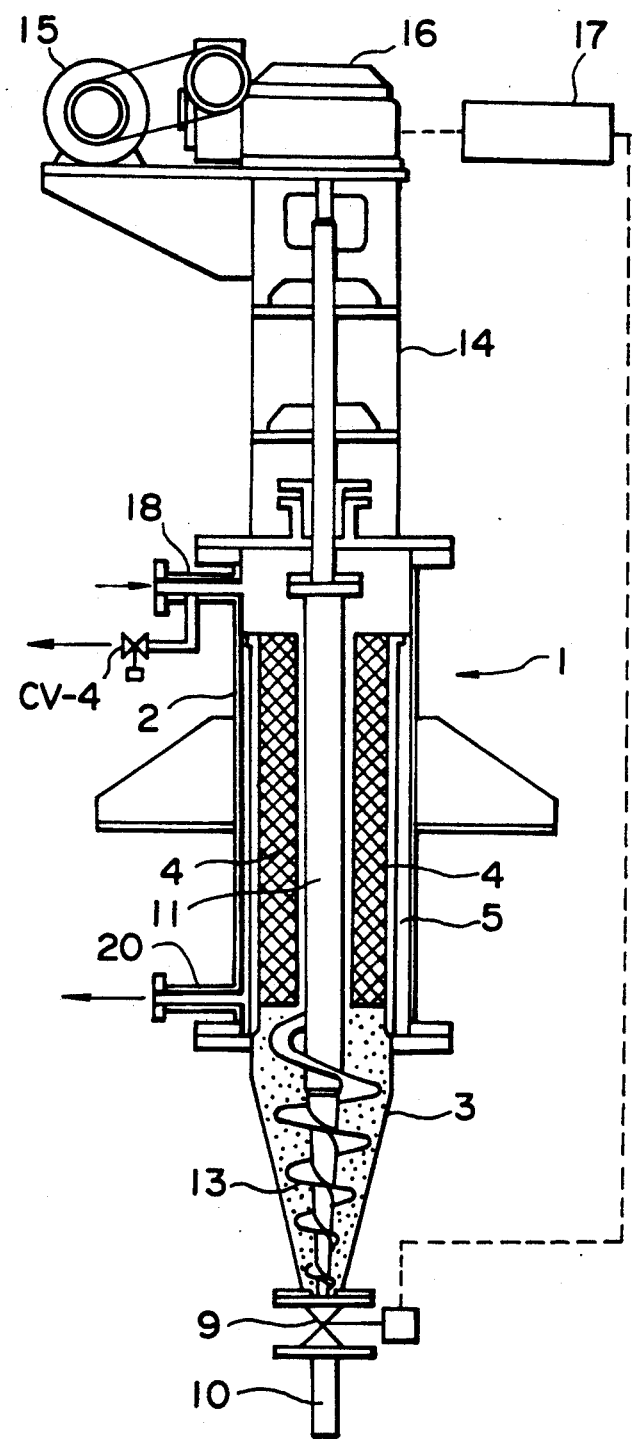
FIG. 5 is a sectional side view showing the main portion of another embodiment of the apparatus of the present invention.

In the embodiment illustrated in FIG. 5, in the filtering zone of the continuous filter press, plate-shaped of corrugated filter media 4 projecting in the radial direction are arranged at intervals in the circumferential direction of a cylindrical filter medium on the inner wall surface of the filtering zone. If these filter media are disposed, the filtration area can be increased, as shown in FIG. 6.

Figure 7:
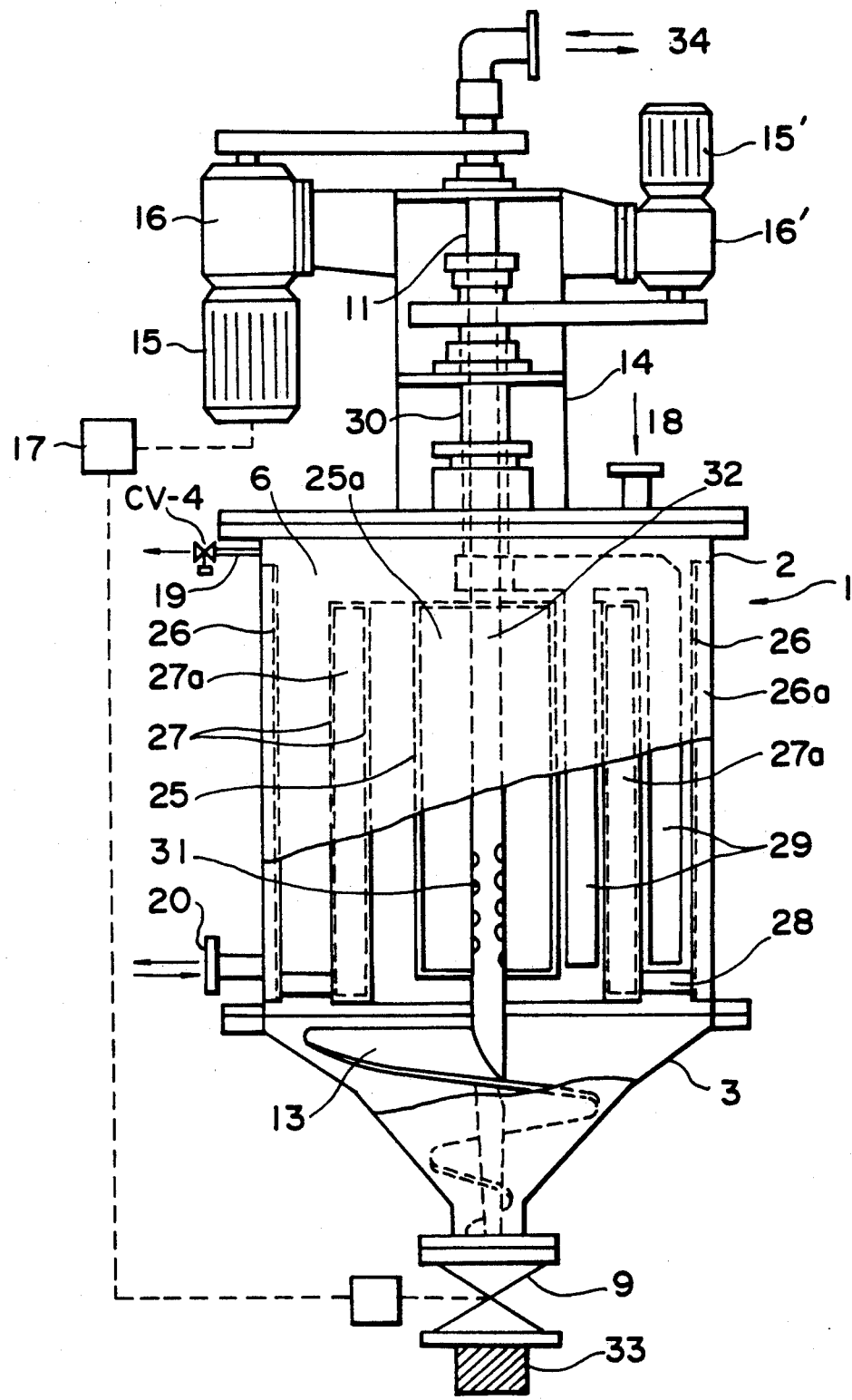
FIG. 7 is a sectional side view showing the main portion of still another embodiment of the apparatus of the present invention.

In the embodiment shown in FIG. 7, in the filtering zone of the continuous filter press, an inner cylindrical filter medium is disposed coaxially with the driven shaft, and outer cylindrical filter media are arranged at small space apart from the casing of the filtering zone. Furthermore, at least one doughnut-shaped cylindrical filter medium is disposed between the inner cylindrical filter medium and the outer cylindrical filter media, and scraping blades are provided among them to scrape the filter cake.

The filtration apparatus proper 1 in this embodiment comprises a cylindrical filtering zone 2, a conical cake-compressing zone 3, and the filtering zone 2 is vertically arranged and a cake-compressing zone 3 is connected to the lower portion of the filtering zone.

An inner cylindrical filter medium 25 is arranged on the driving shaft 11 rotatably together with the driving shaft 11. Reference numeral 25a represents an inner space of this filler medium. An outer cylindrical filter medium 26 is disposed on a perforated support at a small distance apart from the inner wall of the filtering zone 2, and a filtrate-collecting space 26a is formed between the filter medium 26 and the inner wall of the filtering zone 2. If desired, one doughnut-shaped filter medium 27 can be added in the space between the filter media 25 and 26. An interior space 27a of the filter medium 26a communicates with the space 26a through a passage 28.

A hollow shaft 30 provided with a filter cake-scraping knife is attached to the driving shaft 11, and a driving motor 15' and a reduction gear 16' are arranged for driving this hollow shaft 30. Namely, the shaft 30 is driven independently from the driving shaft 11 at a rotation number different from that of the driving shaft 11.

The filtrate 25a flows in a filtrate passage 32 along the axis of the driving shaft 11 through a hole 31. The filtrate from the space 25a is discharged to the outside through the filtrate passage 34. Reference numeral 33 represents a cake to be discharged.

Figure 8:
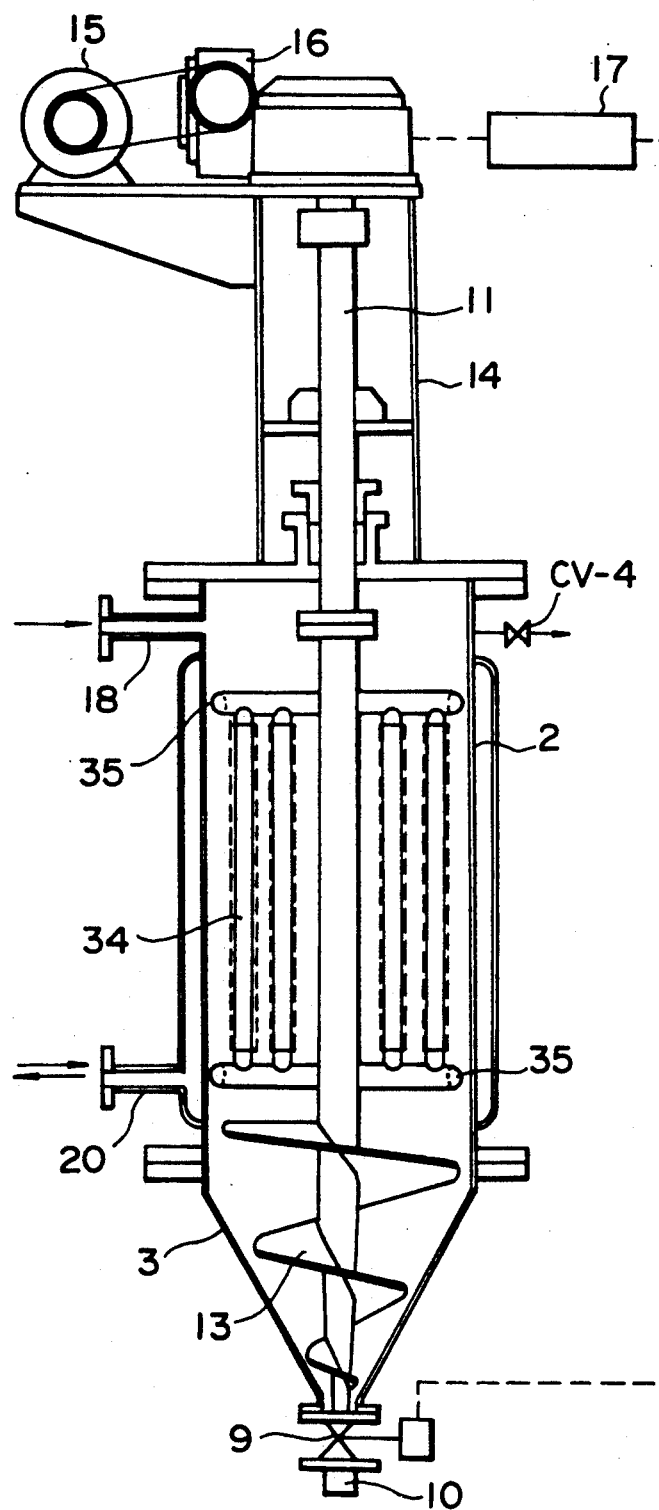
FIG. 8 is a sectional side view showing the main portion of still another embodiment of the apparatus of the present invention.

In the embodiment shown in FIG. 8, the filtering zone of the continuous filter press comprises a manifold 35 holding a plurality of tubular filter media 34. The cake-compressing zone 3 having a conical shape is connected to the lower portion of the cylindrical filtering zone 2 which is vertically arranged. A slurry supply pipe 18 and a slurry relief valve CV-4 are arranged in the upper portion of the filtering zone 2 and a filtrate discharge pipe 20 communicating with the manifold 35 is provided in the lower portion of the filtering zone 2. A cake discharge valve 9 is arranged below the cake-compressing zone 3.

Figure 9:
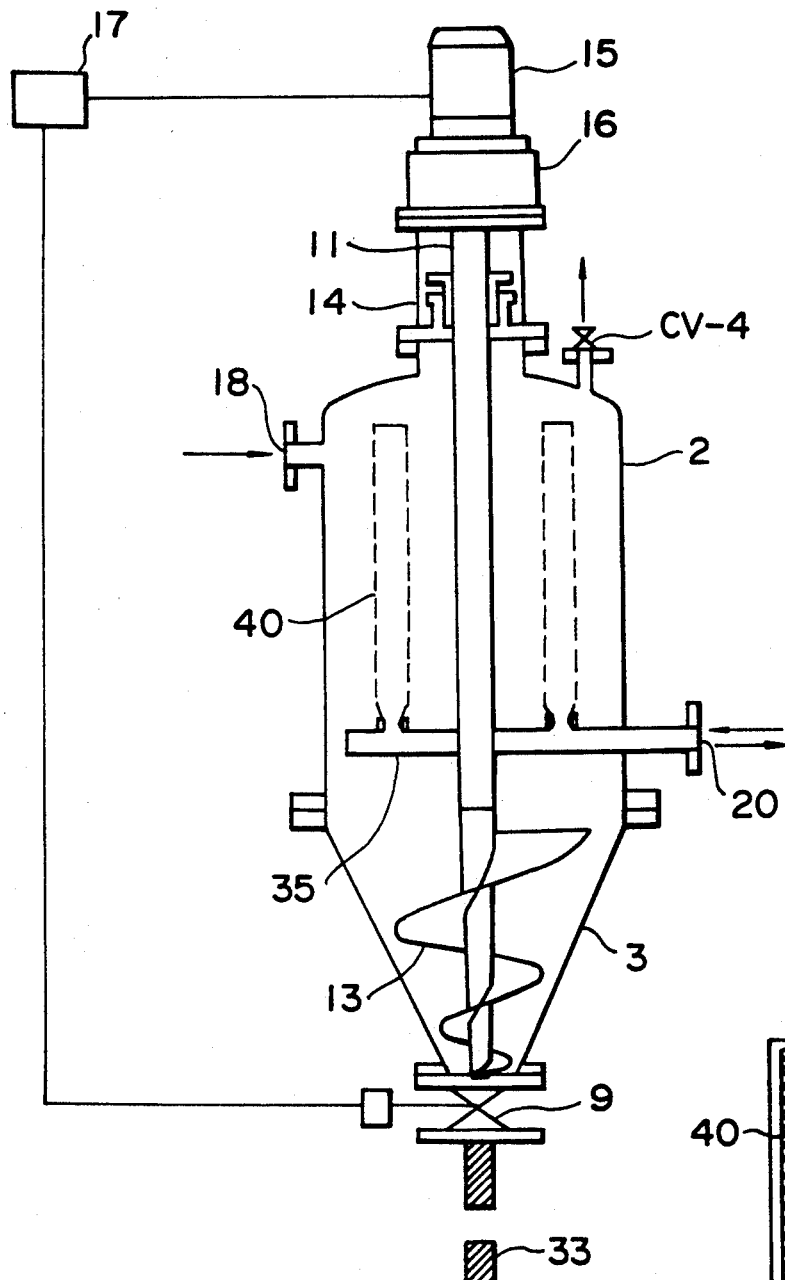
FIG. 9 is a sectional side view showing the main portion of still another embodiment of the apparatus of the present invention.
Figure 12:
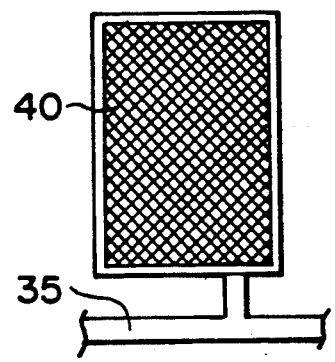
FIG. 12 is a diagram illustrating the filter medium arranged in the filtering zone in the apparatus shown in FIG. 9 or 10.

In the embodiment shown in FIG. 9, the filtering zone 2 of the continuous filter press has a cylindrical shape and is vertically arranged, and the cake-compressing zone 3 having a conical shape is connected to the lower portion of the filtering zone 2. A manifold 35 having a plurality of circular, square or rectangular filter media 40 held thereon is arranged in the filtering zone 2.

Figure 10:
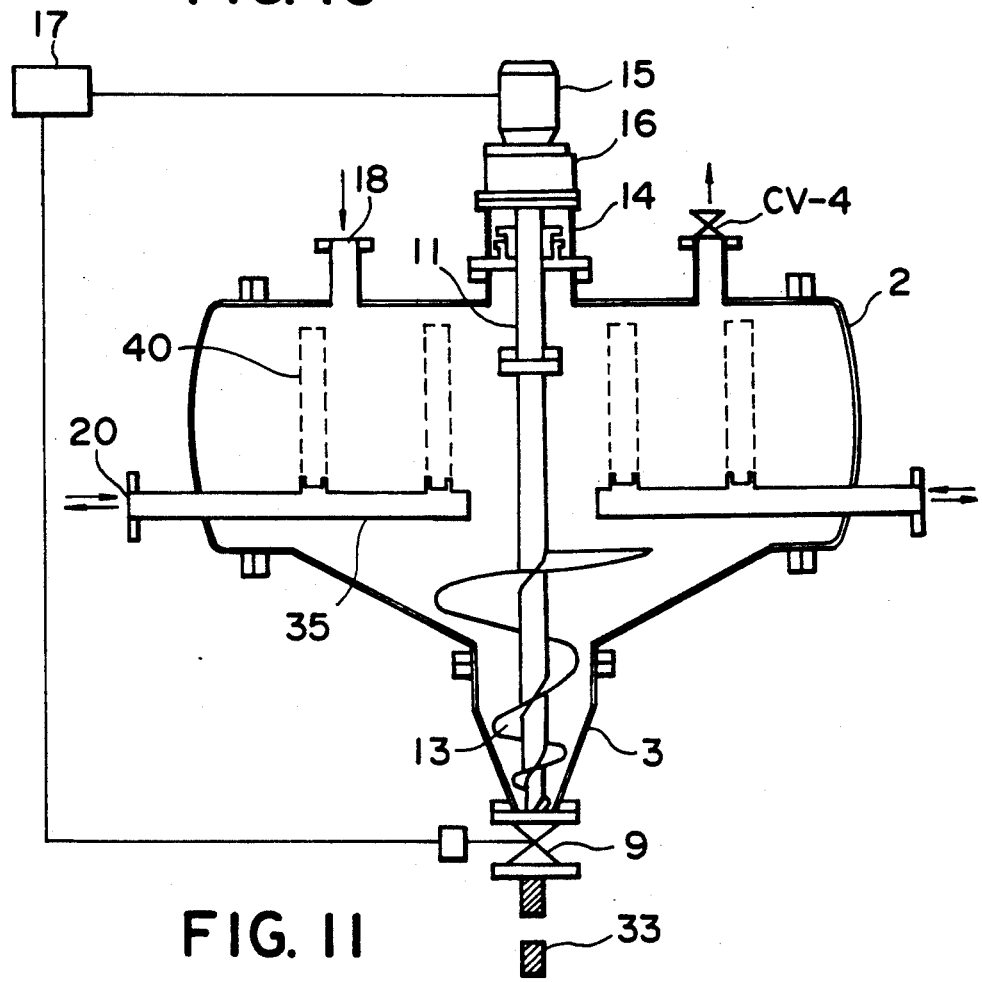
FIG. 10 is a sectional side view showing the main portion of still another embodiment of the apparatus of the present invention.
Figure 11:
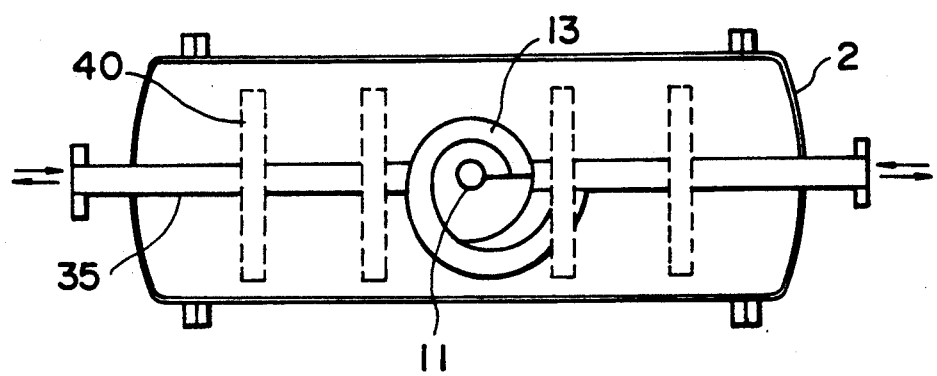
FIG. 11 is a sectional plane view of the filtering zone of the apparatus shown in FIG. 10.

In the embodiment shown in FIGS. 10 and 11, the filtering zone 2 of the continuous filter press, which has a cylindrical shape, is laterally arranged, and the cake-compressing zone 3 having a tapered shape is connected to the lower portion of the filtering zone 2. A manifold 35 having a plurality of circular, square or rectangular filter media 40 held therein is arranged in the filtering zone 2.

The continuous filter press of the present invention comprises a filtering zone exclusively used for filtration and a cake-compressing zone exclusively used for compression of cakes, and this filtering zone is divided into a slurry- and cake-holding chamber and a filtrate-collection chamber. In this vessel, a slurry is fed under pressure to effect filtration and compression of a cake, and peeling of the cake, while the plug up of the filter medium are detected as the pressure difference between the slurry- and cake-containing chamber and the filtrate-collecting chamber, the decrease of the flow rate of the filtrate or the lapse of the filtering time. By this detection, the supply of the slurry is stopped and a washing liquid is fed under pressure to the filtrate-collecting chamber, and the slurry is intermittently relieved and the washing liquid is flushed through the filter medium. According to the present invention having the above-mentioned structure, the following advantages can be attained.

(1) A series of the filtering operation, the cake-discharging operation and the filter medium-washing operation can be automatically performed effectively with considerably reducing the loss time, that makes the filtration substantially continuously.

(2) All the operations can be conducted in the closed system, and filtration and washing can be accomplished only by utilizing the pressure of the slurry and the pressure of the washing liquid and the changeover between these two operations can be effected very promptly and automatically.

(3) By utilizing intermittent flushing of the washing liquid, washing of the filter medium is accomplished in a very short time with use of a small amount of the washing liquid.

(4) Compression of the cake is conducted even during the washing operation and the peeled cake is automatically dropped and fed into the cake-compressing zone by the flushing of the washing liquid, and therefore, compression of the cake and discharge of the compressed cake are conducted automatically during the operation of the filtration, with the result that the efficiency and productivity can be drastically increased.

(5) Because of the advantage (2), the operation safety is kept and there is no substantial risk of environmental pollution.

(6) By dint of the foregoing advantages, the present invention can be effectively applied to continuous filtration of a variety of slurries differing in the properties and the like, with no operator attending.

I claim:

1. An enclosed and continuous filter press comprising:
    a pressure vessel;
    a filter zone within said pressure vessel partitioned by a filter into a filtrate chamber (A) and a chamber (B) for containing a slurry and a filter cake, said chamber (B) having a slurry feed inlet, said slurry feed inlet including a slurry feed inlet valve;
    a cake compressing zone disposed within said pressure vessel below and connected to said chamber (B) for compressing filter cake falling from the chamber (B);
    a cake discharging control valve connected to said cake compressing zone for discharging cake compressed in said zone;
    a rotatable hollow shaft, having an axis, passing through the filter zone and the cake compressing zone and having a compacting screw at a portion thereof positioned in the cake compressing zone;
    motor means for applying torque to said hollow shaft to rotate said hollow shaft about said axis;
    a means to feed a slurry to be filtered under pressure to said slurry feed inlet;
    said filter comprises (a) an outer cylindrical filter provided along an inner wall of said pressure vessel, (b) an inner cylindrical filter provided around said hollow shaft, and (c) a doughnut-shaped filter provided between said filters (a) and (b), these filters (a), (b) and (b) being arranged coaxially with said hollow shaft;
    said chamber (A) comprises a first filtrate collecting chamber which is a space between said inner wall of said pressure vessel and said filter (a), a second filtrate collecting chamber which is an internal space between said hollow shaft and said filter (b) and a third filtrate collecting chamber which is an internal space of said filter (c);
    a plurality of orifices formed in the portion of said hollow shaft positioned in said second filtrate collecting chamber for receiving filtrate flowing into said second filtrate collecting chamber and discharging said filtrate through an inner space of said hollow shaft;
    said first filtrate collecting chamber and said third filtrate collecting chamber being connected by a fluid passage, and filtrate collected in said first and third filtrate collecting chambers being dischargeable from said first filtrate collecting chamber,
    a fluid passage line, connected to a filtrate outlet valve and a backwashing liquid inlet valve, connected to said hollow shaft and said first filtrate collecting chamber;
    a means for feeding a backwashing liquid under pressure to said backwashing liquid inlet valve;
    said filter zone containing blades, rotatably mounted on said hollow shaft for rotation about said axis, said blades being independently driven for rotation about said axis by a drive mechanism in order to scrape off the cake accumulated on said filters (a), (b) and (c);
    a first detecting means for detecting the compression extent of the cake in said cake compressing zone by measuring torque variations of said hollow shaft and generating a first control signal in response thereto;
    a first control means for opening and closing said cake discharge control valve in response to said first control signal;
    a second detecting means for detecting the plug-up of said filters (a), (b) and (c) and generating a second control signal in response thereto;
    a second control means for closing said filtrate outlet valve and said slurry feed inlet valve and opening said backwashing liquid inlet valve in response to said second control signal to stop discharge of filtrate from the chamber (A) and feed a backwashing liquid under pressure to the chamber (A) for a predetermined period of time; and
    relief valve means responsive to said second control means for releasing a small amount of slurry from said chamber (b) during the feeding of the backwash liquid, whereby a pressure in chamber (B) is reduced and backwashing is performed.

2. The filter press of claim 1 wherein said second detecting means detects the plug-up of said filters (a), (b) and (c) by detecting a decrease in a flow rate of said filtrate.

3. The filter press of claim 1 wherein said second detecting means detects the plug-up of said filters (a), (b) and (c) by detecting an increase of a pressure difference between the chamber (A) and the chamber (B).

4. An enclosed and continuous press comprising:
    a pressure vessel;
    a filter zone within said pressure vessel partitioned by a filter into a filtrate chamber (A) and a chamber (B) for containing a slurry and a filter cake, said chamber (B) having a slurry feed inlet, said slurry feed inlet including a slurry feed inlet valve;
    a cake compressing zone disposed within said pressure vessel below and connected to said chamber (B) for compressing filter cake falling from the chamber (B);

a cake discharge control valve connected to said cake compressing zone for discharging cake compressed in said zone;

a rotatable shaft, having an axis, extending through the filter zone and the cake compressing zone, and having a compressing screw at a portion thereof positioned in the cake compressing zone;

motor means for applying torque to said shaft to rotate said shaft about said axis;

a means to feed a slurry to be filtered under pressure to said slurry feed inlet;

said filter comprises a plurality of vertical tubular filters, an upper end portion and a lower end portion of each of these vertical tubular filters being fluidically connected to an upper manifold and a lower manifold, respectively;

a fluid passage line, connected to a filtrate outlet valve and a backwashing liquid inlet valve, connected to said upper and lower manifolds, filtrate being flowable into the chamber (A), which is a space within said plurality of tubular filters, being passable through said manifold and releasable outside via the filtrate outlet valve, and the backwashing liquid being introducible into the chamber (A) via the backwashing liquid inlet valve and said manifolds;

a means for feeding a backwashing liquid under pressure to said backwashing liquid inlet valve;

a first detecting means for detecting the compression extent of the cake in said compressing zone by measuring torque variations of the shaft and generating a first control signal in response thereto;

a first control means for opening and closing the cake discharge control valve in response to said first control signal;

a second detecting means for detecting the plug-up of said plurality of filters and generating a second control signal in response thereto;

a second control means for closing the filtrate outlet valve and the slurry feed inlet valve and opening the backwashing liquid inlet valve in response to said second control signal to stop discharge of the filtrate from the chamber (A) and feed a backwashing liquid under pressure to the chamber (A) for a predetermined period of time; and relief valve means responsive to said second control means for releasing a small amount of slurry from said chamber (b) during the feeding of the backwash liquid, whereby a pressure in chamber (B) is reduced and backwashing is performed.

5. The filter press of claim 4 wherein the second detecting means detects the plug-up of said tubular filters by detecting a decrease in a flow rate of the filtrate.

6. The filter press of claim 4 wherein the second detecting means detects the plug-up of said tubular filters by detecting an increase of a pressure difference between the chamber (A) and the chamber (B).

7. An enclosed and continuous filter press comprising:

a pressure vessel;

a filter zone within said pressure vessel partitioned by a filter into a filtrate chamber (A) and a chamber (B) for containing a slurry and a filter cake, said chamber (B) having a slurry feed inlet, said slurry feed inlet including a slurry feed inlet valve;

a cake compressing zone disposed within said pressure vessel below and connected to the chamber (B) for compressing filter cake falling down from the chamber (B);

a cake discharge control valve connected to said cake compressing zone for discharging the cake compressed in the zone;

a rotatable shaft, having an axis, extending through the filter zone and the cake compressing zone and having a compressing screw at a portion thereof positioned in the cake compressing zone;

a means to feed a slurry to be filtered under pressure to said slurry feed inlet;

said filter consisting of a plurality of circular or rectangular filter elements, each element fluidically connected to a manifold;

a fluid passage line, connected to a filtrate outlet valve and a backwashing liquid inlet valve, connected to the manifold, filtrate being flowable into the chamber (A), which is an inside space of said plurality of filter elements, being passable through the manifold and releasable outside via the filtrate outlet valve and the manifold and a backwashing liquid being introducible into the chamber (A) via the backwashing liquid inlet valve and the manifold;

a means for feeding a backwashing liquid under pressure to said backwashing liquid inlet valve;

a first detecting means for detecting the compression extent of the cake in the cake compressing zone by measuring torque variations of the shaft and generating a first control signal in response thereto;

a first control means for opening and closing the cake discharge control valve in response to said first control signal;

a second detecting means for detecting the plug-up of said plurality of filter elements and generating a second control signal in response thereto;

a second control means for closing the filtrate outlet valve and the slurry feed inlet valve and opening the backwashing liquid inlet valve in response to said second control signal to stop discharge of the filtrate from the chamber (A), and feed the backwashing liquid under pressure to the chamber (A) for a predetermined period of time;

relief valve means responsive to said second control means for releasing a small amount of slurry from said chamber (b) during the feeding of the backwash liquid, whereby a pressure in chamber (B) is reduced and backwashing is performed.

8. The filter press of claim 7 wherein the second detecting means detects the plug-up of said filter by detecting a decrease in a flow rate of the filtrate.

9. The filter press of claim 7 wherein the second detecting means detects the plug-up of said filter by detecting an increase of a pressure difference between the chamber (A) and the chamber (B).

* * * * *